(12) United States Patent
Kufeld et al.

(10) Patent No.: US 6,420,497 B1
(45) Date of Patent: Jul. 16, 2002

(54) SOLIDS CONCENTRATION IN SLURRY POLYMERIZATION

(75) Inventors: Scott E. Kufeld, Houston; John H. Tait, Stafford; George O. Obath; Wesley R. Qualls, both of Houston; Garry A. Marek, Dayton, all of TX (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/453,675

(22) Filed: Dec. 3, 1999

(51) Int. Cl.$^7$ ................................................. C08F 10/00
(52) U.S. Cl. ...................... 526/64; 526/106; 526/346; 522/132
(58) Field of Search .................... 526/64, 106, 346; 522/132

(56) References Cited

U.S. PATENT DOCUMENTS

| | | | |
|---|---|---|---|
| 4,219,403 A | 8/1980 | Nakako et al. | ................ 208/10 |
| 4,291,132 A | 9/1981 | Clifford | ........................ 525/53 |
| 4,332,777 A | 6/1982 | Pazdej | ........................ 423/98 |
| 4,424,341 A | 1/1984 | Hanson et al. | ............... 528/501 |
| 4,613,484 A | 9/1986 | Ayers et al. | ................. 422/132 |
| 4,737,280 A | 4/1988 | Hanson | ........................ 210/181 |
| 5,241,023 A | 8/1993 | Brule et al. | ................... 526/70 |
| 5,575,979 A | * 11/1996 | Hanson | ........................ 422/132 |
| 5,597,892 A | 1/1997 | Hanson | ........................ 528/501 |

FOREIGN PATENT DOCUMENTS

EP      891 990 A2  * 1/1999     ........... C08F/10/00

* cited by examiner

Primary Examiner—David W. Wu
Assistant Examiner—Caixia Lu
(74) Attorney, Agent, or Firm—Polly C. Owen (57) ABSTRACT

An olefin polymerization apparatus is disclosed wherein monomer, diluent and catalyst are circulated in a continuous pipe loop reactor and an intermediate product slurry is recovered by a continuous product take off means. The intermediate product slurry is passed to a hydrocyclone to stratify polymer particles based on size. A slurry containing predominantly fines is withdrawn overhead and returned to the reaction zone. The slurry containing predominantly fines is preferably returned to the polymerization zone just upstream of the circulation pump and in a preferred embodiment this pressure differential is the sole driving force for the hydrocyclone separation. In another embodiment the product slurry from the bottom of the hydrocyclone is passed to a solids-liquid separator where the solids settle to the bottom and essentially polymer free diluent is recycled. In another embodiment, the intermediate product slurry is withdrawn via a conical settling leg. Because of the converging nature of the leg, as polymer is withdrawn the velocity increases progressively going from the entry to the exit of the leg thus avoiding polymer buildup.

15 Claims, 6 Drawing Sheets

SOLIDS CONCENTRATION IN SLURRY POLYMERIZATION

BACKGROUND OF THE INVENTION

This invention relates to withdrawing a slurry of a solid in a liquid from a flowing stream of the slurry.

Addition polymerizations are frequently carried out in a liquid which is a solvent for the resulting polymer. When high density (linear) ethylene polymers first became commercially available in the 1950's this was the method used. It was soon discovered that a more efficient way to produce such polymers was to carry out the polymerization under slurry conditions. More specifically, the polymerization technique of choice became continuous slurry polymerization in a pipe loop reactor with the product being taken off by means of settling legs which operated on a batch principle to recover product. This technique has enjoyed international success with billions of pounds of ethylene polymers being so produced annually.

One problem presented by this technique relates to the matter of "fines." The produced polymer is in the form of particles of varying sizes suspended in the diluent. The smaller particles are referred to as fines. The fines may be the result of many factors. Some polymer particles form during a single pass through the reactor loop and exit the first time they come to a take off point. Such particles may be smaller because of their shorter time in the reaction zone. Other particles make varying numbers of loops before being withdrawn. For these particles, some may be physically broken up by contact with the pump impeller. Others may be in diluent which is heated by friction at the impeller surface to the point that bubbles are formed, which bubbles later collapse and fracture polymer particles. Other fines may be the result of smaller catalyst particles.

The mechanism by which the polymer is formed involves a catalyst site adding together literally thousands of monomer units in a fraction of a second and thereafter terminating the polymer chain and starting another. Hence, the small particles do not represent lower molecular weight material—the molecular weight is controlled by well known process variables. Thus the polymer molecules making up large particles and small particles are of essentially the same molecular weight. Rather, the fines are undesirable because they interfere with downstream polymer finishing.

All of this is to be distinguished from fines that may result downstream in the polymer finishing operation where diluent containing a small amount of low molecular weight (and hence soluble) polymer is flashed with the result that the low molecular weight material precipitates out as low molecular weight fines. Because they are in admixture with vapor these low molecular weight fines can be separated from the vapor with a cyclone separator.

Cyclone separators which separate solids from vapors are to be distinguished from hydrocyclone separators, sometimes referred to as liquid separators. These hydrocyclone separators stratify solid particles in a liquid slurry based on particle size.

The settling legs themselves also can present problems. First, they represent the imposition of a "batch" technique onto a basically continuous process. Each time a settling leg reaches the stage where it "dumps" or "fires" accumulated polymer slurry, it causes an interference with the flow of slurry in the loop reactor upstream and the recovery system downstream. Also, conventional settling legs have sections in which polymer can collect while waiting for the next dump cycle and such collected polymer can melt over time and deposit on the inside walls of the settling leg.

In spite of these limitations, settling legs continue to be employed. This is because, as the name implies, settling occurs in the legs to thus increase the solids concentration of the slurry finally recovered as product.

Slurry can be withdrawn on a continuous basis by taking advantage of the fact that without the periodic upsets caused by settling leg firings, a higher overall reactor concentration can be achieved.

SUMMARY OF THE INVENTION

It is an object of one aspect of this invention to separate fines from a slurry reactor effluent by means of a hydrocyclone and recycle the fines to the reaction zone;

It is another object of this invention to reduce the energy required to separate diluent from product polymer solids; and It is yet another object of this invention to avoid polymer build-up in the take off means;

In accordance with one embodiment of this invention, slurry comprising polymer and diluent is withdrawn from a flowing stream and passed to a hydrocyclone where fines and a portion of the diluent are separated from the remaining slurry as overhead and recycled to the reaction zone. In accordance with one aspect of this embodiment, the hydrocyclone bottom slurry is passed to a solid-liquid separator where additional diluent is separated from the polymer. In accordance with another aspect of this embodiment, the hydrocyclone bottoms slurry is passed through a heated flash line prior to further downstream processing.

In accordance with another embodiment of this invention, an olefin polymerization is carried out in a loop reaction zone under conditions of high solids concentration and a portion of the circulating slurry is withdrawn through a tapered settling leg.

BRIEF DESCRIPTION OF THE DRAWINGS

In the drawings, forming a part hereof.

DETAILED DESCRIPTION OF THE INVENTION

Surprisingly in accordance with this invention the imposition of a hydrocyclone between an effluent take off and downstream solids-diluent separation results in better quality product (because of drastically reduced fines) with little or no increase in energy usage because the reactor pressure differential between the take off point and the pump suction drives this step.

By fines is meant any arbitrary delineation between larger particles which are desired for final processing and smaller particles which it is desired to recycle back to the reactor. Generally, fines are those particles which have a diameter of 100–200 microns or less. One common definition is those particles which will go through a 100 mesh screen, i.e. less than about 150 microns (5.9 mils) in diameter. The operational set point of the hydrocyclone can be based on the percentage of polymer going overhead and the percentage taken out the bottom of the hydrocyclone. For instance the recycle diluent can carry from about 1–75, preferably 20–50, more preferably 20–40 weight percent of the polymer, the remaining portion going out in the diluent removed from the bottom. Alternatively a suitable set point is that at which there is a 50/50 weight percent split in particles of an arbitrary size within, say, the 100 to 200 micron range, between fines going overhead and the larger particles going out the bottom. For instance, 150 microns could be chosen such that 50 weight percent of particles of that size went overhead and 50 weight percent went out the bottom with the product slurry. At sizes progressively smaller than that arbitrary set point a progressively greater than 50 weight percent proportion goes overhead. Similarly, at progressively larger sizes, a progressively greater proportion goes out the bottom in the product slurry. Thus the recycle diluent is concentrated in fines and the product slurry concentrated in larger particles.

By "concentrated in fines" is meant having a significantly higher concentration of fines (at least about 5 wt. percent higher, generally at least 50 wt. percent higher) than was present in the feed to the hydrocyclone. By "concentrated in larger particles" is meant having a significantly lower concentration of fines (at least about 5 wt. percent lower, preferably at least 25 wt. percent lower, generally at least 50 percent lower) than was present in the feed to the hydrocyclone.

This invention is of primary utility in olefin polymerizations in a loop reactor utilizing a diluent, so as to produce a product slurry of polymer and diluent. Suitable olefin monomers are 1-olefins having up to 8 carbon atoms per molecule and no branching nearer the double bond than the 4-position. The invention is particularly suitable for the homopolymerization of ethylene and the copolymerization of ethylene and a higher 1-olefin such as butene, 1-pentene, 1-hexene, 1-octene or 1-decene. Especially preferred is ethylene and 0.01 to 20, preferably 0.01 to 5, most preferably 0.1 to 4 weight percent higher olefin based on the total weight of ethylene and comonomer. Alternatively sufficient comonomer can be used to give the above-described amounts of comonomer incorporation in the polymer.

Suitable diluents (as opposed to solvents or monomers) are well known in the art and include hydrocarbons which are inert or at least essentially inert and liquid under reaction conditions. Suitable hydrocarbons include isobutene, n-butane, propane, n-pentane, i-pentane, neopentane, and n-hexane, with isobutane being especially preferred.

Suitable catalysts are well known in the art. Particularly suitable is chromium oxide on a support such as silica as broadly disclosed, for instance, in Hogan and Banks, U.S. Pat. No. 2,285,721 (March 1958), the disclosure of which is hereby incorporated by reference. Also suitable are organometal catalysts including those known in the art as "Ziegler" or "Ziegler-Natta" catalysts.

In one embodiment of the invention, a polymerization process is provided comprising:
1) introducing into a continuous elongated polymerization zone at least one monomer, catalyst, and a diluent under polymerization conditions which include sufficient pressure to maintain the diluent in the liquid state, thus producing a slurry of polymer particles in said diluent;
2) creating a zone of lower pressure and a zone of higher pressure to circulate the slurry through the elongated polymerization zone;
3) withdrawing a portion of the slurry, the portion comprising withdrawn liquid diluent and withdrawn solid polymer particles comprising fines and larger particles as an intermediate product of the process;
4) introducing the withdrawn diluent and withdrawn solid polymer particles into a separation zone;
5) withdrawing a recycle slurry concentrated in the fines from a top portion of the separation zone and passing the recycle slurry back to the polymerization zone;
6) withdrawing a product slurry concentrated in the larger particles from a bottom portion of the separation zone; and
7) passing all of the product slurry to downstream processing.

In one aspect of this embodiment, at least one monomer is at least one olefin monomer and the withdrawing a portion of the slurry is done on a continuous basis.

In another aspect of this embodiment, the recycle slurry is passed to the zone of lower pressure, and withdrawing a portion of the slurry is done from the zone of higher pressure. The withdrawn liquid diluent and the withdrawn solid polymer particles are introduced into the separation zone tangentially, and the pressure differential is the sole driving force of the separation.

In yet another aspect of this embodiment, at least one monomer comprises ethylene and 0.01–5 weight percent of a higher 1-olefin. The diluent comprises isobutane, and the catalyst comprises chromium oxide. The fines have a particle size of less than 150 microns, and the product slurry has at least 50 percent lower fines as compared with the intermediate product of the process.

In yet another aspect of this embodiment, the recycle slurry and the product slurry are controlled so as to give a recycle comprising 20–40 weight percent of the withdrawn solid polymer particles introduced into the separation zone.

In still yet another aspect of this embodiment, the product slurry concentrated in the larger particles is passed to a solids-liquid separation zone. The liquid diluent is essentially free of polymer and is withdrawn from an upper zone of the solids-liquid separation zone and recycled to the polymerization zone. Typically, the slurry of polymer particles in diluent in the polymerization zone is maintained at a concentration of at least 40 weight percent solid olefin polymer particles based on the weight of the polymer particles and the weight of the diluent. A concentrated product slurry is withdrawn from a bottom zone of the solid-liquid separation zone.

The concentrated product slurry can be passed to a heated zone to give a heated concentrated product slurry. The heated concentrated product slurry can be passed to a single flash zone wherein a major portion of diluent therein is vaporized and thus separated from solid polymer particles in the heated concentrated slurry. The separated diluent thereafter can be condensed for recycle, without any compression, by heat exchange.

Alternatively, the heated concentrated product slurry can be passed to a high pressure flash zone where it is exposed to a pressure drop such that a major portion of diluent therein is vaporized thus leaving solid polymer particles and entrained diluent. The solid polymer particles and entrained diluent are withdrawn from a bottom zone of the high pressure flash zone. The withdrawn solid polymer particles and entrained diluent are then passed to a low pressure flash zone.

In a second embodiment of this invention, a polymerization process is provided. The process comprises:

1) introducing into a continuous elongated polymerization zone at least one monomer, catalyst and diluent under polymerization conditions, thus producing a slurry of polymer particles in the diluent;
2) circulating the slurry through the elongated polymerization zone;
3) withdrawing a portion of slurry wherein the portion comprises withdrawn diluent and withdrawn solid polymer particles comprising fines and larger particles as an intermediate product of the process;
4) introducing the withdrawn diluent and the withdrawn solid polymer particles into a separation zone;
5) withdrawing a recycle slurry concentrated in the fines from a top potion of the separation zone and passing the recycle slurry back to the polymerization zone;
6) withdrawing a product slurry concentrated in the larger particles from a bottom portion of the separation zone;
7) passing the product slurry concentrated in larger particles to a solids-liquid separation zone;
8) withdrawing diluent essentially free of polymer from an upper zone of the solids-liquid separation zone and recycling the thus withdrawn diluent to the polymerization zone; and
9) withdrawing a concentrated product slurry from a bottom zone of the solids-liquid separation zone.

In another aspect of this second embodiment, the monomer comprises ethylene and 0.01–5 weight percent 1-hexene based on the total weight of the ethylene and the hexane. The diluent is isobutene, and the catalyst comprises chromium oxide.

In another aspect of the second embodiment, the polymerization zone is maintained liquid full.

In yet another aspect of the second embodiment, withdrawing of a portion of the slurry is done on a continuous basis.

In a third embodiment of this invention, a polymerization process is provided. The process comprises:

1) polymerizing, in a loop reaction zone, at least one olefin monomer in a liquid diluent in the presence of catalyst to produce a fluid slurry comprising liquid diluent and solid olefin polymer particles;
2) maintaining a concentration of the solid olefin polymer particles in the fluid slurry in the reaction zone of greater than 40 weight percent based on the weight of the polymer particles and the weight of the liquid diluent;
3) providing a conical settling zone having an upper zone in open communication with the fluid slurry and a lower settling zone; and
4) periodically opening communication between the lower settling zone and a downstream processing zone to thus withdraw the resulting product slurry.

Figure 1:
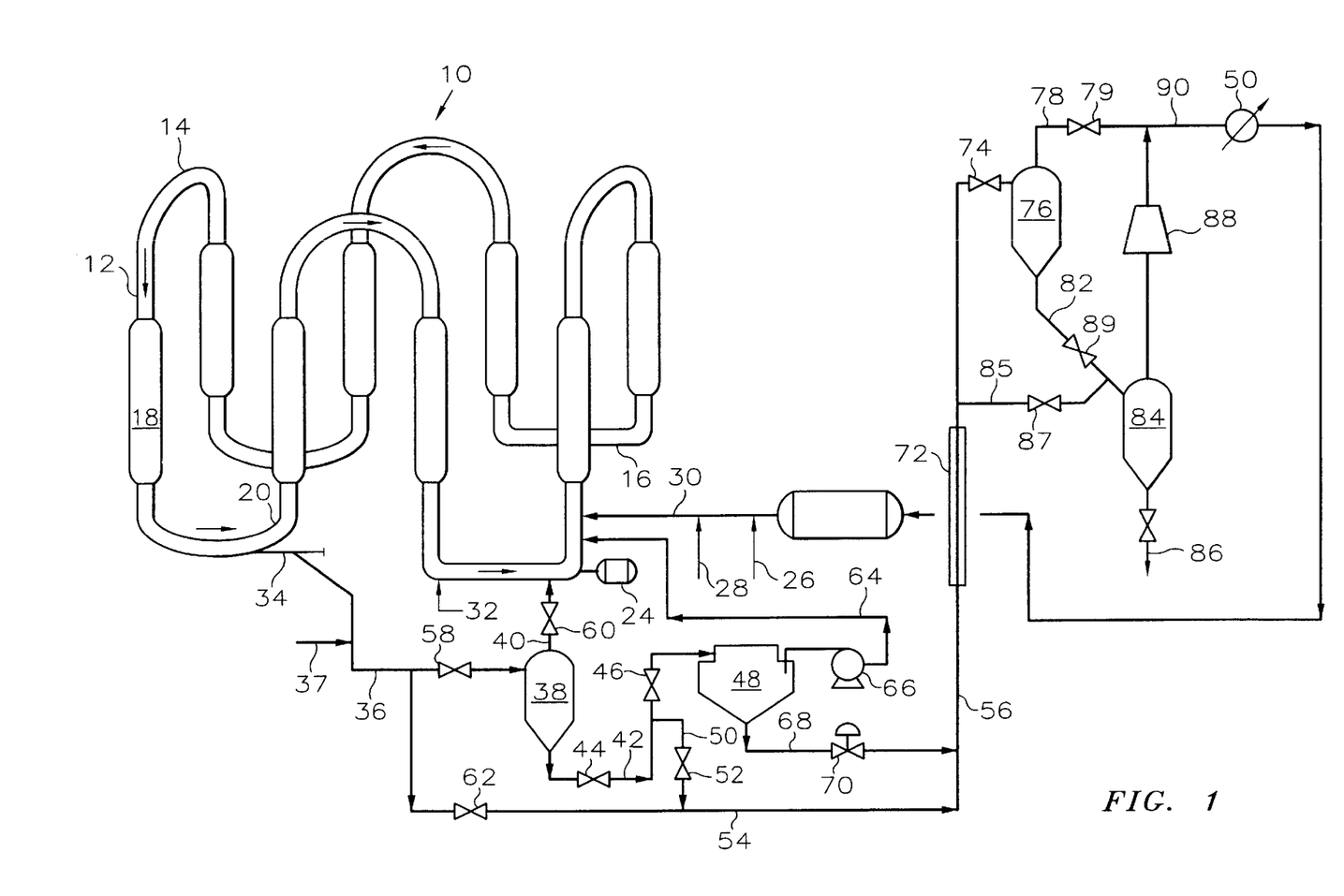
FIG. 1 is a schematic perspective view of a loop reactor having a take off means and a downstream polymer recovery system.

Referring now to the drawings, there is shown in FIG. 1 a loop reactor 10 having vertical pipe segments 12, upper lateral pipe segments 14 and lower lateral pipe segments 16. These upper and lower lateral pipe segments define upper and lower zones of horizontal or generally lateral (as opposed to straight vertical) flow. The reactor is cooled by means of two-pipe heat exchangers formed by pipe 12 and jacket 18. Each segment is connected to the next segment by a smooth bend or elbow 20 thus providing a continuous flow path substantially free from internal obstructions. As shown here, all of the upper segments and two of the lower segments are continuously curved and the remaining two lower segments are straight pipes connected at each end to a vertical segment by the smooth bend or elbow. The continuously curved segments can be simply two elbows connected together. Reference herein to lateral pipe segments is meant to include two 90 degree elbows affixed together, a smoothly curved segment or a straight pipe connected at each end by an elbow to a vertical pipe. The polymerization mixture is circulated by means of impeller 22 (shown in FIG. 4) driven by motor 24. Monomer, comonomer, if any, and make up diluent are introduced via lines 26 and 28 respectively which can enter the reactor directly at one or a plurality of locations or can combine with condensed diluent recycle line 30 as shown. Catalyst is introduced via catalyst introduction means 32 which provides a zone (location) for catalyst introduction. The elongated hollow appendage (take off means) for taking off an intermediate product slurry is designated broadly by reference character 34.

Withdrawn slurry effluent is conveyed via effluent withdrawal line 36 and preferably introduced into hydrocyclone 38, valve 58 thus being open and valve 62 closed. Diluent carrying smaller particles of polymer (fines) passes via fines recycle line 40 through valve 60 to a zone of reduced pressure within the reactor caused by the suction of the pump as described in greater detail hereinafter in the description of FIG. 2 and FIG. 4. Slurry carrying the larger particles is withdrawn through open valve 44 via product line 42.

At this point this product slurry can pass directly to downstream processing via line 50, valve 52 being open and valve 46 being closed. Alternatively the product slurry can pass to solid-liquid separator 48, valve 46 being open and valve 52 closed. Generally, all of the bottoms slurry will either be passed to solid-liquid separator 48 or all of it will be passed directly to downstream processing via line 54. However, in a less preferred option a portion could be passed to separator 48 and a portion via conduits 54 and 56 directly to flash line heater 72.

Figure 3:
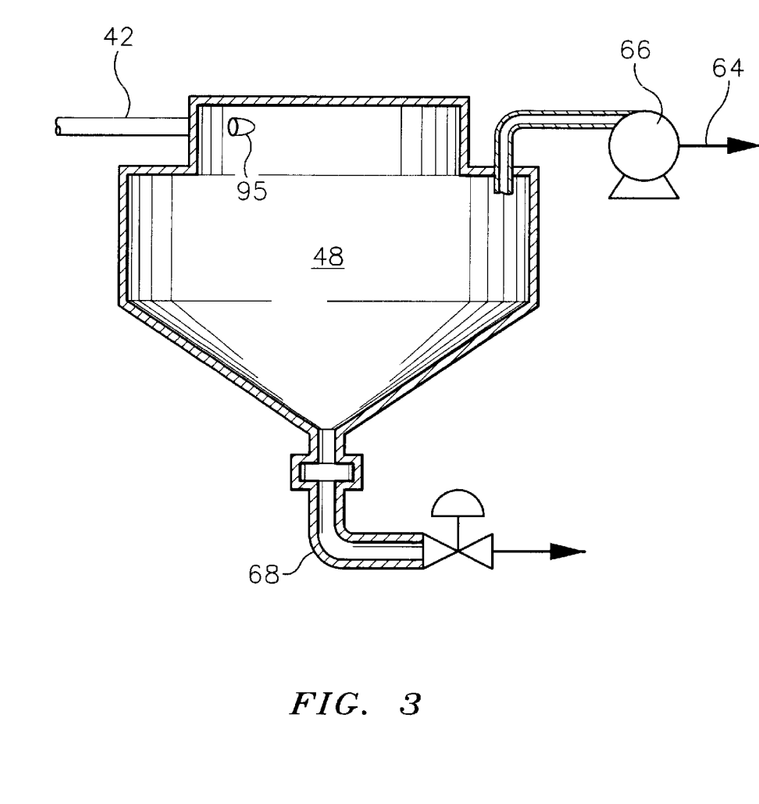
FIG. 3 is a cross section of the solid-liquid separator of FIG. 1.

In solid-liquid separator 48, the solids settle to the bottom as described in greater detail in the description of FIG. 3. Liquid (essentially diluent) is pumped out by means of recycle line pump 66 and recycled to the reactor via separator liquid recycle line 64. The thus concentrated slurry is then passed via concentrated slurry line 68 through valve 70 to heated flash line 56 for diluent separation and polymer recovery as will be described in detail hereinafter.

Figure 2:
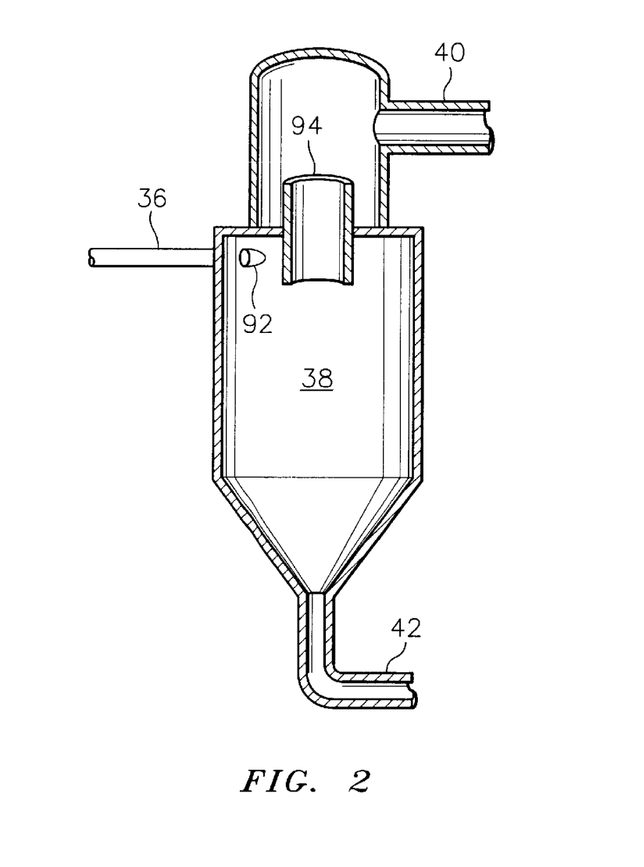
FIG. 2 is a cross section of the hydrocyclone of FIG. 1.

FIG. 2 shows hydrocyclone 38 in greater detail. Hydrocyclones are well known in the art and can be readily obtained from commercial sources. A hydrocyclone with an internal diameter of 25–30 inches is satisfactory, for instance. The effluent slurry withdrawn can be introduced directly into the hydrocyclone via entry port 92 which is preferably tangential. The entry port is in the upper portion of the hydrocyclone, i.e. above the mid point, but below the actual top portion of the hydrocyclone. The inertia carries the larger particles in a downward spiral path predominantly adjacent to the outer walls and into the lower section, which is generally conical as shown, where they collect and are withdrawn off the bottom as a product slurry via line 42. The smaller particles are pulled into central vortex finder 94 and exit the top as a slurry in the diluent withdrawn via fines recycle line 40. There are no moving parts in the hydrocyclone and generally the separation is entirely driven by the pressure differential between the pressure in the reactor at the point of the take off means 34 and the suction zone of the circulating pump. If necessary a small pump could be used as a minor supplement to drive the fines recycle stream. If desired, diluent could be added via line 37 (FIG. 1) to adjust the slurry concentration to the optimum level for the hydrocyclone, but preferably this is not done.

FIG. 3 shows in detail the solid-liquid separator. Solid-liquid separators are well known in the art and can be readily obtained from commercial sources. Slurry carrying predominantly larger polymer particles and diluent is introduced via product line 42 through entry 95 which is preferably a tangential entry as shown. As the mass of slurry flowing into the separator reaches the larger diameter portion it slows down and the solids settle to the bottom where they are withdrawn via concentrated slurry line 68. Liquid largely free of solids is pumped out by pump 66 and returned to the reactor via separator recycle line 64 which is located in an upper portion of the solid-liquid separator, i.e. above the mid point but below the top and below the entry port.

Figure 4:
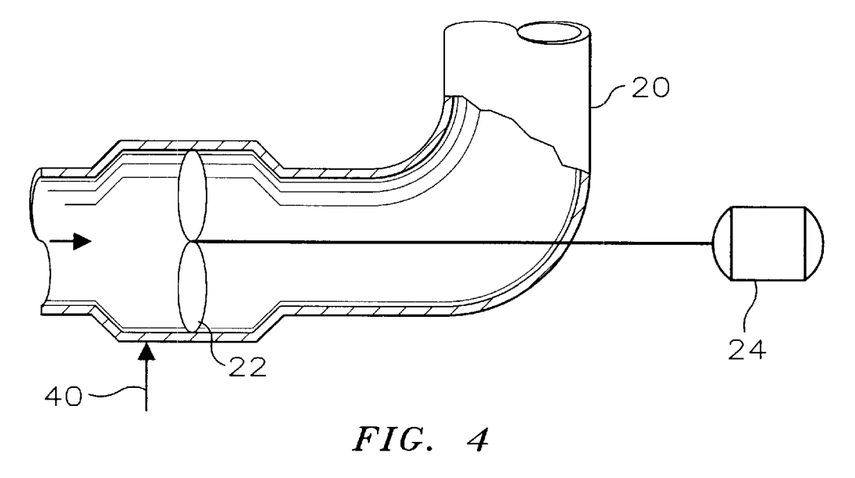
FIG. 4 is a partial cross section of the circulation pump area of the reactor showing the impeller.

FIG. 4 shows in greater detail the reactor circulating pump means for continuously moving the slurry along its flow path. As can be seen in this embodiment the impeller 22 is in a slightly enlarged section of pipe which serves as the propulsion zone for the circulating reactants. Preferably the system is operated so as to generate a pressure differential of at least 12 psi, generally about 12.5 psi. As much as 50 psi or more is possible. This can be done by controlling the speed of rotation of the impeller, reducing the clearance between the impeller and the inside wall of the pump housing or by using a more aggressive impeller design as is known in the art. This higher pressure differential can also be produced by the use of at least one additional pump. This figure shows fines recycle line 40 entering at the suction end of the pump.

Generally the system is operated so as to generate a pressure differential, expressed as a loss of pressure per unit length of reactor, of at least 0.07, generally 0.07 to 0.15 foot pressure drop per foot of reactor length for a nominal 24 inch diameter reactor. Preferably, this pressure drop per unit length is 0.09 to 0.11 for a 24 inch diameter reactor. The units for the pressure are ft/ft which cancel out. This assumes the density of the slurry which generally is about 0.45–0.6 g/cc.

The vertical segments are generally at least twice the length, generally about seven to eight times the length of the horizontal segments. For instance, the vertical flow path can be 190–225 feet and the horizontal (or generally lateral) segments 25–30 feet in flow path length. Any number of loops can be employed in addition to the eight depicted but generally four or six are used. Reference to nominal two foot diameter means an internal diameter of about 21.9 inches. Flow length is generally greater than 500 feet, generally greater than 900 feet, with about 940 to 1,350 feet being quite satisfactory.

Alternatively the longer axis can be disposed horizontally.

Commercial pumps for utilities such as circulating the reactants in a closed loop reactor are routinely tested by their manufacturers and the necessary pressures to avoid cavitation are easily and routinely determined.

Reactor slurry flow rate is generally within the range of 10,000 to 40,000, preferably 25,000 to 35,000 gallons/minute. The average time for the slurry to make one complete pass through the reaction zone is generally within the range of 20 to 90, preferably 30 to 60 seconds.

Figure 5:
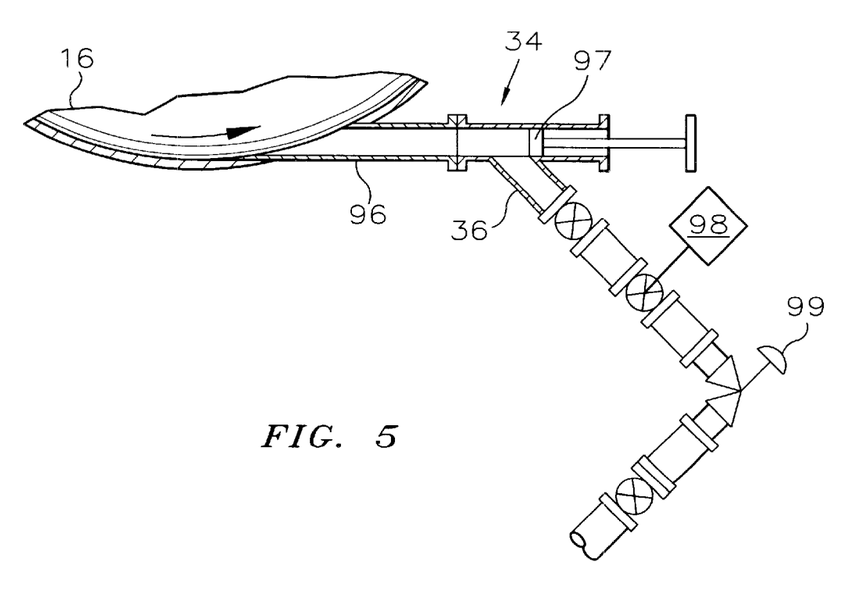
FIG. 5 is a side view partly in section of a portion of a reactor loop of FIG. 1 showing one embodiment of a continuous take off mechanism in greater detail.

Referring now to FIG. 5, there is shown the smooth curve of lower pipe segment 16 having associated therewith a take off mechanism 34 in the form of a continuous take off. As shown, the mechanism comprises a take off cylinder 96 attached, in this instance, at a tangent to the outer surface of curved pipe segment 16. Coming off cylinder 96 is slurry withdrawal line 36. Disposed within the take off cylinder 96 is a ram valve 97 which serves two purposes. First it provides a simple and reliable clean-out mechanism for the take off cylinder if it should ever become fouled with polymer. Second, it can serve as a simple and reliable shut-off valve for the entire continuous take off assembly. Emergency shut off valve 98 allows for an emergency shut down and proportional motor valve 99 regulates flow. Take off cylinder 96 can have an internal diameter in the range of about 1–8 inches, preferably 1.5–3 inches, most preferably about 3 inches.

It is noted that there are orientation concepts here. One is the attachment angle of the take off cylinder, i.e. tangential as in FIG. 5 or perpendicular as in FIG. 5A and FIG. 8 or any angle between these two limits of 0 and 90 degrees.

Another is the radial angle from the center plane of the longitudinal segment. This angle is preferably 0 or about 0.

Commercial production of predominantly ethylene polymers in isobutane diluent using settling legs has historically been limited to a maximum solids concentration in the reactor of 37–40 weight percent for high 0.936–0.970 (more typically 0.945–0.960) density ethylene polymers with values as high as 42–46 weight percent possible with maximized process enhancements. With lower (0.900–0.935 more typically 0.920–0.935) density polymers values as high as 36–39 are possible with process enhancements (but still using settling legs). Whatever the maximum for a given set of process conditions, improvement in solids concentration is possible simply by taking the slurry off continuously.

It must be emphasized that in a commercial operation as little as a one percentage point increase in solids concentration is of major significance. With lower density ethylene polymers where the starting point is 36–39 weight percent solids in the reactor, similar increases (i.e. at least 10, or even 15 percentage points) can be achieved.

Figure 5A:
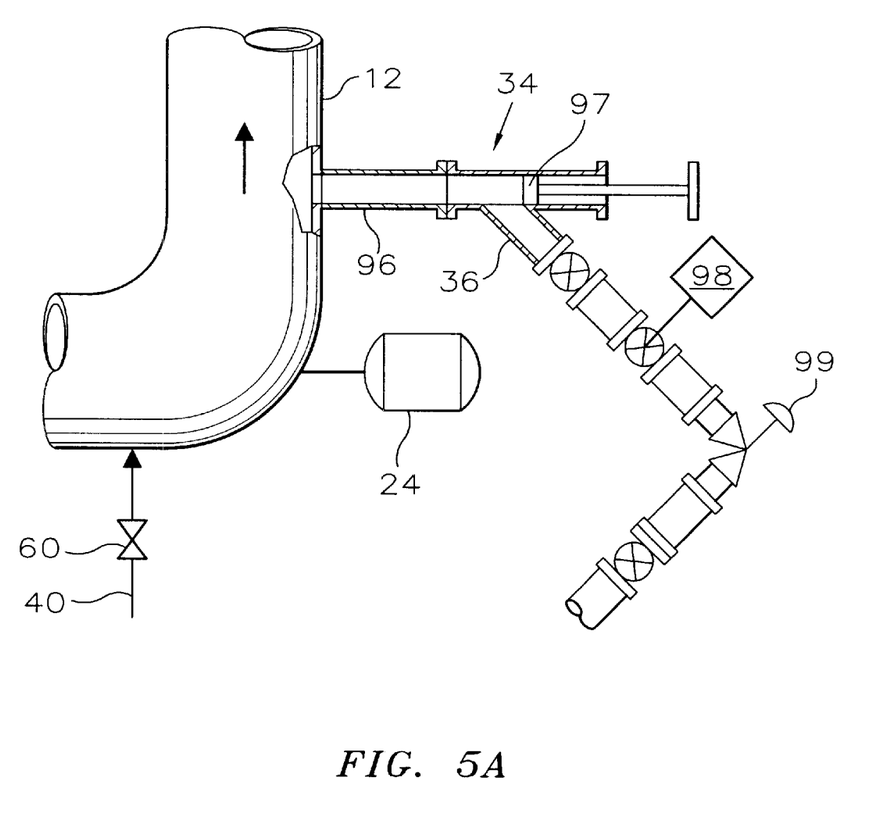
FIG. 5A is a view similar to FIG. 5 except the take off mechanism comes off from a vertical leg of the reactor.

FIG. 5A shows a take off in the form of a continuous take off attached laterally at a 90 degree angle. The take off location is just downstream of the circulation means and the recycle return just upstream so as to give the greatest possible pressure differential to drive the hydrocyclone.

Figure 6:
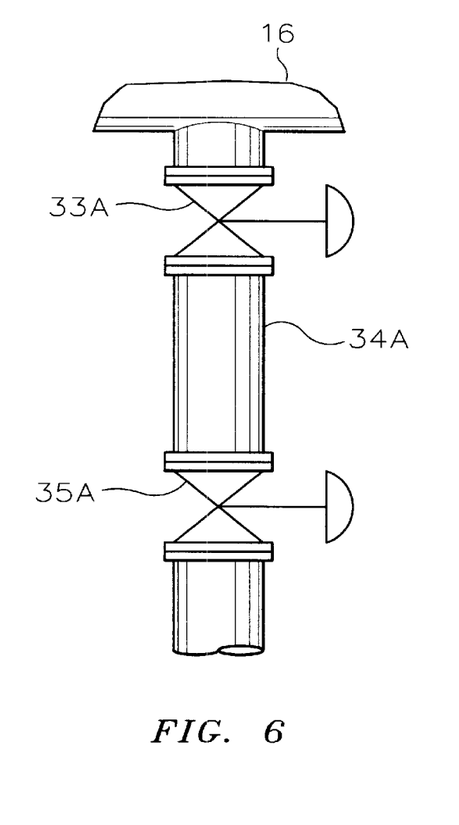
FIG. 6 is a side view showing a conventional settling leg.

FIG. 6 shows a conventional settling leg 34A coming off a lower pipe section 16. Valves 33A and 35A operate as follows. Block valve 33A is open continuously except when closed for settling leg maintenance. Polymer take off valve 35A is closed for a period of time, generally about 0.25–3 minutes, preferably about 0.5 to 1.5 minutes, more preferably about 1 minute. Then valve 35A is opened to allow the accumulated slurry to exit. Such settling legs can vary somewhat in size but are generally about 6–10 inches in internal diameter, preferably about 8 inches, with the block valve being of similar size. Polymer take off valve 35A is generally about 3 inches in internal diameter.

Figure 7:
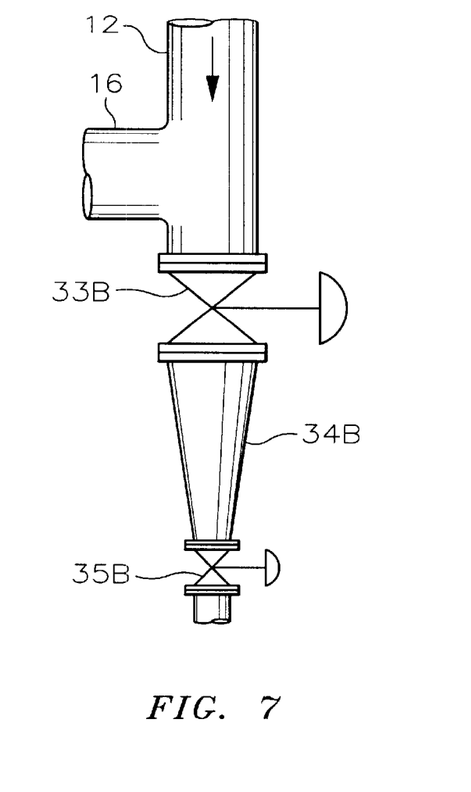
FIG. 7 is a side view showing a tapered take off means.

FIG. 7 shows a take off means 34B located at the bottom of a downflow loop segment 12 although it could be located anywhere along a lower pipe segment 16. Valves 33B and 35B operate in the same manner as valves 33A and 35A. However the take off means is in the shape of a cone with the upper zone in open communication with the fluid slurry in the reaction zone and a lower settling zone from which polymer slurry can be removed periodically. In this way as the exit valve 35A is opened and the slurry contained in the cone shaped settling leg exits it flows down the tapered walls and increases in velocity thus inhibiting build up of polymer on the walls.

The tapered take off legs can have an upper internal diameter within the range of 4–24 inches, preferably 6–10 inches, more preferably about 8 inches. Alternatively the size can be defined relative to the internal diameter of the reactor pipes with the upper diameter of the tapered take off thus being from about 25–50 percent of the reactor pipe internal diameter. In all instances the internal diameter of the upper end of the tapered take off means 34B is at least twice, generally about four times, the internal diameter of the lower end. The lower end of the tapered take off can have an internal diameter within the range of 1–8, preferably 1.5–3, more preferably about 2–3 inches.

Figure 8:
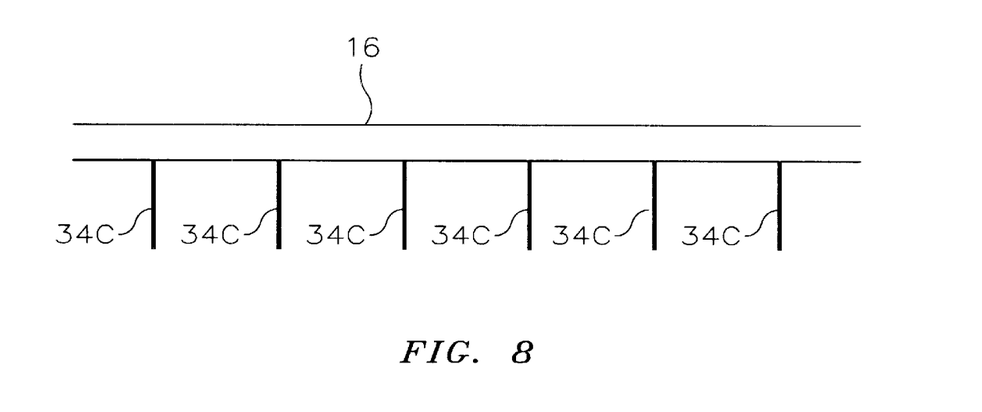
FIG. 8 is schematic side view of a reactor leg showing multiple take off means.

FIG. 8 shows a lower pipe section 16 having a plurality of take off means 34C. These can be continuous take off means as depicted in FIG. 5. In an alternative embodiment of the invention, each of these take off means can be a conventional settling leg as shown in FIG. 6, or, preferably a tapered settling leg as shown in FIG. 7. With a plurality of intermittent take off means the flow to the hydrocyclone can be essentially continuous.

In another embodiment of the invention, a continuous take off means can utilize the cone shaped shape of FIG. 7 and valves 33A and 35A are simply left open except during a total shutdown of the take off means. In this embodiment of this invention the conical leg takes the place of the take off cylinder 96 of FIG. 5 (except in this embodiment it would generally be disposed vertically). By simply taking a product slurry effluent stream off continuously, a small but significant increase in reactor solids concentration (at least 1 wt. per cent) is made possible because the absence of upsets in the flowing slurry stream caused by the periodic "firing" of a batch settling leg. This absence of upsets also allows operating at higher circulation velocities which gives an additional small, but significant, increase reactor solids concentration.

This embodiment is less preferred because with a continuous take off, polymer build up is not a significant problem.

Figure 9:
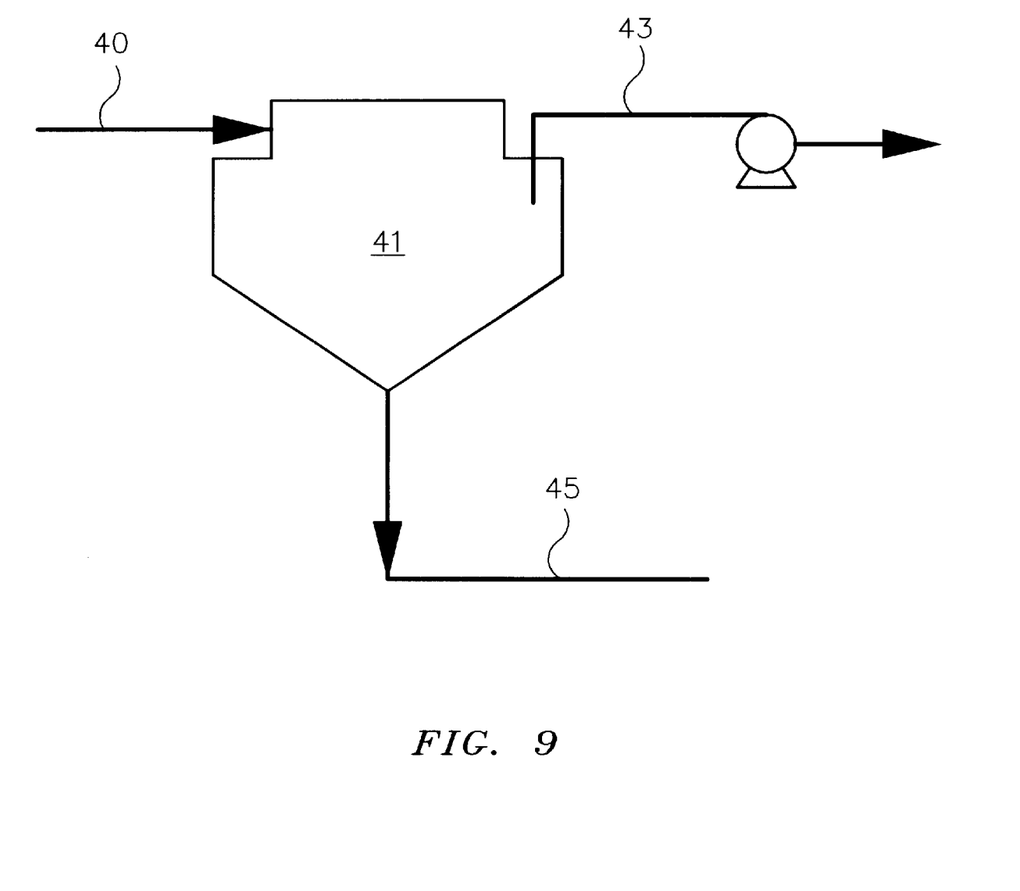
FIG. 9 is a schematic side view showing a solid-liquid separator which can be used in a preferred embodiment of the invention.

FIG. 9 shows a second solid-liquid separator, 41, which can be used in an alternative embodiment of the invention. In this embodiment, fines recycle line 40 can go to this separator instead of going directly back to the reactor. In separator 41 the fines are separated from the diluent with the diluent being taken overhead via line 43. Line 43 can go directly back to the reactor via valve 60 for instance or can connect with any downstream line such as 42, 64, or 56. In this way fines can be separately collected via line 45 and passed to any conventional finishing operation. Such a fines removal line is not generally needed, however since most of the fines have active catalyst cites and, on reintroduction into the reactor grow to normal size. Hence there is no need to separately remove fines to prevent gradual build up of an unacceptably high level of fines in the reactor.

Referring now back to FIG. 1, the slurry in conduit 56 is passed to a high pressure flash chamber 76. Conduit 56 includes a surrounding conduit 72 which is provided with a heated fluid which provides indirect heating to the slurry material in flash line conduit 56 This constitutes a flash line heater. The high pressure flash chamber (zone) can be operated at a pressure within the range of 100–1500 psia (7–105 kg/cm$^2$), preferably 100–275 psia (7–19 kg/cm$^2$), more preferably 125–200 psia (8.8–14 kg/cm$^2$). The high pressure flash chamber (zone) can be operated at a temperature within the range of 100–250 F. (37.8–121 C.), preferably 130–230 F. (54.4–110 C.), more preferably 150–210 F. (65.6–98.9 C.). The narrower ranges are particularly suitable for polymerizations using 1-hexene comonomer and isobutane diluent, with the broader ranges being suitable for higher 1-olefin comonomers and hydrocarbon diluents in general.

The low pressure flash chamber (zone) can be operated at a pressure within the range of 15–65 psia (1.05–4.57 kg/cm$^2$), preferably 16–45 psia (1.12–3.16 kg/cm$^2$) more preferably 18–25 psia (1.27–1.76 kg/cm$^2$). The low pressure flash chamber (zone) can be operated at a temperature within the range of 100–250 F. (37.8–121 C.), preferably 130–230 F. (54.4–110 C.), more preferably 150–210 F (65.6–98.9 C.). Generally the temperature in the low pressure flash chamber zone will be the same or 1–20 F. (0.6–11 C.) below that of the high pressure flash chamber zone although operating at a higher temperature is possible. The narrower ranges are particularly suitable for polymerizations using 1-hexene comonomer and isobutane diluent, with the broader ranges being suitable for higher 1-olefin comonomers and hydrocarbon diluents in general.

Vaporized diluent exits the flash chamber 76 via conduit 78 for further processing which includes condensation by simple heat exchange using recycle condenser 50, and return to the system, without the necessity for compression, via recycle diluent line 30. Recycle condenser 50 can utilize any suitable heat exchange fluid known in the art under any conditions known in the art. However preferably a fluid at a temperature that can be economically provided is used. A suitable temperature range for this fluid is 40 degrees F. to 130 degrees F. Polymer particles and entrained liquid are withdrawn from high pressure flash chamber 76 via line 82 for further processing using techniques known in the art. Preferably they are passed to low pressure flash chamber 84 and thereafter recovered as polymer product via line 86. The entrained liquid (primarily diluent) flashes overhead and passes through compressor 88 to line 78 thus forming combined line 90. This high pressure/low pressure flash design is broadly disclosed in Hanson and Sherk, U.S. Pat. No. 4,424,341 (Jan. 3, 1984), the disclosure of which is hereby incorporated by reference.

Thus in accordance with one embodiment of the invention, a hydrocyclone is positioned between a continuous take off and a flash line heater.

In accordance with more specific embodiments of this invention, the continuous take off and hydrocyclone are operated in conjunction with a high pressure/low pressure flash system. The continuous take off not only allows for higher solids concentration in the reactor, but also allows better operation of the high pressure flash, thus allowing the majority of the withdrawn diluent to be flashed off and recycled with no compression. This is because of several factors. First of all, because the flow is continuous instead of intermittent, the flash line heaters work better. Also, the subsequent pressure drop is more efficient because of the continuous flow thus giving better cooling. Because of the hydrocyclone, the solids are not only more concentrated but are also are predominantly large particle size.

Alternatively, the reactor effluent can be passed directly to the low pressure flash chamber 84 via line 85. When operating with both flash chambers, valve 87 is closed and valves 74, 79 and 89 are open. However in accordance with this alternative, valves 74, 79 and 89 are closed and valve 87 is open or else no high pressure flash chamber is present at all.

The use of the hydrocyclone in combination with the solid-liquid separator lends itself especially well to going directly to the low pressure flash and compress the small amount of diluent present. In this single flash embodiment, the flash line heater formed by conduit 72 can be eliminated; if desired, however, the flash line heater can be used in conjunction with a single flash chamber (i.e. flash chamber 84) which can be operated at the typical pressure for the low pressure zone.

In accordance with another embodiment of the invention, take off means 34 is tapered and the slurry periodically withdrawn is passed directly through the flash line heater via lines 36 and 54. In this embodiment, solids concentration in the reactor is maintained at greater than 40 weight percent. The high solids concentration makes the process more efficient and the tapered shape of the settling leg inhibits polymer build up.

The reactor is run "liquid" full. Because of dissolved monomer the liquid has slight compressibility, thus allowing pressure control of the liquid full system with a valve. Diluent input is generally held constant, the proportional motor valve 99 being used to control the rate of continuous withdrawal to maintain the total reactor pressure within designated set points.

Throughout this application, the weight of catalyst is disregarded since the productivity, particularly with chromium oxide on silica, is extremely high.

While this invention has been described in detail for the purpose of illustration, it is not to be construed as limited thereby, but is intended to cover all changes within the spirit and scope thereof.

That which is claimed is:

1. A polymerization process comprising:
   introducing into a continuous elongated polymerization zone at least one monomer, catalyst and a diluent under polymerization conditions which include sufficient pressure to maintain said diluent in the liquid state, thus producing a slurry of polymer particles in said diluent;
   creating a zone of lower pressure and a zone of higher pressure to circulate said slurry through said elongated polymerization zone;
   withdrawing a portion of said slurry, said portion comprising withdrawn liquid diluent and withdrawn solid polymer particles comprising fines and larger particles as an intermediate product of said process;
   introducing said withdrawn liquid diluent and withdrawn solid polymer particles into a separation zone;
   withdrawing a recycle slurry concentrated in said fines from a top portion of said separation zone and passing said recycle slurry back to said polymerization zone; and
   withdrawing a product slurry concentrated in said larger particles from a bottom portion of said separation zone; and
   passing all of said product slurry to downstream processing.

2. A process according to claim 1 wherein said at least one monomer is at least one olefin monomer and wherein said withdrawing a portion of said slurry is done on a continuous basis.

3. A process according to claim 2 wherein said recycle slurry is passed to said zone of lower pressure, wherein said withdrawing a portion of said slurry is done from said zone of higher pressure, wherein said withdrawn liquid diluent and withdrawn solid polymer particles are introduced into said separation zone tangentially and wherein the pressure differential is the sole driving force for said separation.

4. A process according to claim 2 wherein said at least one monomer comprises ethylene and 0.01–5 weight percent of a higher 1-olefin said diluent comprises isobutane, said catalyst comprises chromium oxide, said fines have a particle size of less than 150 microns and wherein said product slurry has at least 50 percent lower fines as compared with said intermediate product of said process.

5. A process according to claim 2 wherein said recycle slurry and said product slurry are controlled so as to give a recycle comprising 20–40 weight percent of said withdrawn solid polymer particles introduced into said separation zone.

6. A process according to claim 2 wherein said product slurry concentrated in said larger particles is passed to a solids-liquid separation zone and wherein liquid diluent is withdrawn from an upper zone of said solids-liquid separation zone and recycled to said polymerization zone and wherein a concentrated product slurry is withdrawn from a bottom zone of said solid-liquid separation zone.

7. A process according to claim 6 wherein said concentrated product slurry is passed to a heated zone.

8. A process according to claim 7 wherein said slurry of polymer particles in diluent in said polymerization zone is maintained at a concentration of at least 40 weight percent solid olefin polymer particles based on the weight of said polymer particles and the weight of said diluent.

9. A process according to claim 7 wherein said concentrated product slurry is heated in said heated zone to give a heated concentrated product slurry which is passed to a single flash zone wherein a major portion of diluent therein is vaporized and thus separated from solid polymer particles in said heated concentrated product slurry, the thus separated diluent thereafter being condensed for recycle, without any compression, by heat exchange.

10. A process according to claim 7 wherein said concentrated product slurry is heated in said heated zone to give a heated concentrated product slurry, said process comprising in addition:
    passing said heated concentrated product slurry to a high pressure flash zone where it is exposed to a pressure drop such that a major portion of diluent therein is vaporized thus leaving solid polymer particles and entrained diluent;
    withdrawing said solid polymer particles and entrained diluent from a bottom zone of said high pressure flash zone; and
    passing the thus withdrawn solid polymer particles and entrained diluent to a low pressure flash zone.

11. A polymerization process comprising:
    introducing into a continuous elongated polymerization zone at least one monomer, catalyst and diluent under polymerization conditions, thus producing a slurry of polymer particles in said diluent;
    circulating said slurry through said elongated polymerization zone;
    withdrawing a portion of said slurry, said portion comprising withdrawn diluent and withdrawn solid polymer particles comprising fines and larger particles as an intermediate product of said process;
    introducing said withdrawn diluent and said withdrawn solid polymer particles in a separation zone;
    withdrawing a recycle slurry concentrated in said fines from a top portion of said separation zone passing said recycle slurry back to said polymerization zone;
    withdrawing a product slurry concentrated in said larger particles from a bottom portion of said separation zone;
    passing said product slurry concentrated in said larger particles to a solids-liquid separation zone;
    withdrawing diluent from an upper zone of said solids-liquid separation zone and recycling the thus withdrawn diluent to said polymerization zone; and
    withdrawing a concentrated product slurry from a bottom zone of said solids-liquid separation zone.

12. A process according to claim 11 wherein said monomer comprises ethylene and 0.01–5 weight percent 1-hexene based on the total weight of said ethylene and said hexene, wherein said diluent is isobutane and wherein said catalyst comprises chromium oxide.

13. A process according to claim 12 wherein said polymerization zone is maintained liquid full.

14. A process according to claim 13 wherein said withdrawing a portion of said slurry is done on a continuous basis.

15. A polymerization process comprising:

polymerizing, in a loop reaction zone, at least one olefin monomer in a liquid diluent in the presence of catalyst to produce a fluid slurry comprising liquid diluent and solid olefin polymer particles;

maintaining a concentration of said solid olefin polymer particles in said fluid slurry in said reaction zone of greater than 40 weight percent based on the weight of said polymer particles and the weight of said liquid diluent;

providing a conical settling zone having an upper zone in open communication with said fluid slurry and a lower settling zone;

periodically opening communication between said lower settling zone and a downstream processing zone to thus withdraw the resulting product slurry.

* * * * *